United States Patent
Vecera et al.

(10) Patent No.: US 10,169,213 B2
(45) Date of Patent: Jan. 1, 2019

(54) PROCESSING OF AN APPLICATION AND A CORRESPONDING TEST FILE IN A CONTENT REPOSITORY

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 279 days.

(21) Appl. No.: 13/306,243

(22) Filed: Nov. 29, 2011

(65) Prior Publication Data

US 2013/0139127 A1    May 30, 2013

(51) Int. Cl.
*G06F 9/44* (2018.01)
*G06F 11/36* (2006.01)

(52) U.S. Cl.
CPC .................... *G06F 11/368* (2013.01)

(58) Field of Classification Search
None
See application file for complete search history.

(56) References Cited

U.S. PATENT DOCUMENTS

| | | | | |
|---|---|---|---|---|
| 6,249,882 B1* | 6/2001 | Testardi | ............ | G06F 11/3672 714/38.14 |
| 6,823,478 B1* | 11/2004 | Prologo et al. | ............ | 714/38.14 |
| 7,610,578 B1* | 10/2009 | Taillefer et al. | ............ | 717/124 |
| 8,028,276 B1* | 9/2011 | Bessonov | ............ | G06F 11/3684 717/124 |
| 8,037,453 B1* | 10/2011 | Zawadzki | ............ | G06F 8/71 717/107 |
| 8,140,477 B2* | 3/2012 | Moore et al. | ............ | 707/638 |
| 8,356,282 B1* | 1/2013 | Leippe | ............ | G06F 11/3664 717/125 |
| 8,490,084 B1* | 7/2013 | Alford | ............ | G06F 8/61 717/177 |
| 8,510,602 B2* | 8/2013 | Chen | ............ | 714/38.1 |
| 8,694,964 B1* | 4/2014 | Picard | ............ | G06F 8/73 715/200 |
| 8,850,398 B1* | 9/2014 | L'Heureux | ............ | G06F 11/3688 705/7.25 |
| 8,949,772 B1* | 2/2015 | Talby et al. | ............ | 717/104 |
| 8,978,015 B2* | 3/2015 | Pechanec | ............ | G06F 11/3672 717/126 |
| 2001/0052108 A1* | 12/2001 | Bowman-Amuah | ............ | 717/1 |
| 2002/0078401 A1* | 6/2002 | Fry | ............ | G06F 11/2268 714/30 |
| 2003/0098879 A1* | 5/2003 | Mathews | ............ | G06F 11/3688 715/762 |
| 2003/0182414 A1* | 9/2003 | O'Neill | ............ | G06F 8/65 709/223 |

(Continued)

OTHER PUBLICATIONS

"Continuous Integration Why and How to build a Continuous Integration Environment for the .NET platform," Enterprise Solution Providers, Inc. 2005.*

*Primary Examiner* — Insun Kang
(74) *Attorney, Agent, or Firm* — Lowenstein Sandler LLP

(57) ABSTRACT

A mechanism for continuous integration in a content repository is disclosed. A method of the invention includes retrieving by a computing system an application from an archive of the computing system and executing at least one test file corresponding to the application in the archive. The method further includes storing the application and results from executing the at least one test file as metadata for the application in the content repository.

11 Claims, 3 Drawing Sheets

(56) References Cited

U.S. PATENT DOCUMENTS

| | | | |
|---|---|---|---|
| 2003/0182652 A1* | 9/2003 | Custodio | G06F 8/61 717/122 |
| 2004/0143819 A1* | 7/2004 | Cheng | G06F 11/3688 717/125 |
| 2005/0102323 A1* | 5/2005 | Henderson | G06F 11/3688 |
| 2005/0114838 A1* | 5/2005 | Stobie | G06F 11/3672 717/124 |
| 2005/0166094 A1* | 7/2005 | Blackwell | G06F 11/3664 714/38.14 |
| 2005/0257203 A1* | 11/2005 | Nattinger | G06F 11/323 717/154 |
| 2005/0278338 A1* | 12/2005 | Todorova et al. | 707/10 |
| 2006/0041864 A1* | 2/2006 | Holloway | G06F 11/3688 717/124 |
| 2006/0136904 A1* | 6/2006 | Weidman | G06F 8/71 717/172 |
| 2006/0230384 A1* | 10/2006 | Potts | G06F 11/3688 717/124 |
| 2007/0006041 A1* | 1/2007 | Brunswig | G06F 11/3688 714/38.14 |
| 2007/0079291 A1* | 4/2007 | Roth | G06F 11/3668 717/124 |
| 2008/0046414 A1* | 2/2008 | Haub | G06F 17/30312 |
| 2008/0052587 A1* | 2/2008 | Troelsen | G06F 11/263 714/742 |
| 2008/0109680 A1* | 5/2008 | Kodaka | G06F 11/3688 714/38.1 |
| 2008/0127094 A1* | 5/2008 | Squires | G06F 11/3688 717/124 |
| 2008/0155343 A1* | 6/2008 | Branca | G06F 11/3688 714/38.14 |
| 2008/0184219 A1* | 7/2008 | Matsumoto | G06F 11/1433 717/170 |
| 2009/0070738 A1* | 3/2009 | Johnson | G06F 11/3688 717/106 |
| 2009/0265681 A1* | 10/2009 | Beto | G06F 11/3688 717/100 |
| 2010/0077387 A1* | 3/2010 | Callaghan et al. | 717/140 |
| 2010/0100871 A1* | 4/2010 | Celeskey | G06F 11/3688 717/124 |
| 2010/0125618 A1* | 5/2010 | Dutta | G06F 8/10 707/822 |
| 2010/0275054 A1* | 10/2010 | Grace | G06Q 10/10 714/2 |
| 2010/0306590 A1* | 12/2010 | Anand | G06F 11/3692 714/32 |
| 2010/0318969 A1* | 12/2010 | Petrovicky et al. | 717/124 |
| 2011/0010698 A1* | 1/2011 | Byom | G11C 29/08 717/168 |
| 2011/0083122 A1* | 4/2011 | Chen et al. | 717/124 |
| 2011/0099422 A1* | 4/2011 | Moore, Jr. | G06Q 10/10 714/15 |
| 2011/0296384 A1* | 12/2011 | Pasternak | G06F 11/3688 717/124 |
| 2012/0042210 A1* | 2/2012 | Glaser | G06F 11/3684 714/38.1 |
| 2012/0059919 A1* | 3/2012 | Glaser | G06F 11/3672 709/223 |
| 2012/0089964 A1* | 4/2012 | Sawano | G06F 11/3684 717/124 |
| 2012/0290527 A1* | 11/2012 | Yalamanchilli | G06F 17/30592 707/602 |
| 2012/0304157 A1* | 11/2012 | Kawashima | G06F 11/3672 717/131 |
| 2013/0046787 A1* | 2/2013 | Ford | G06F 17/3056 707/779 |
| 2013/0047036 A1* | 2/2013 | Pechanec | G06F 11/3672 714/38.1 |
| 2013/0086556 A1* | 4/2013 | Grechanik | G06F 11/3684 717/126 |
| 2013/0152047 A1* | 6/2013 | Moorthi | G06F 11/368 717/124 |

* cited by examiner

__US 10,169,213 B2__

PROCESSING OF AN APPLICATION AND A CORRESPONDING TEST FILE IN A CONTENT REPOSITORY

TECHNICAL FIELD

The embodiments of the invention relate generally to a computer system and, more specifically, relate to mechanism for continuous integration in a content repository.

BACKGROUND

Continuous integration is a modern technology used in software engineering and software quality assurance. Continuous integration is a software development practice of frequently integrating new or changed code with an existing code repository, resulting in multiple integrations. Each of the integrations is verified by an automated build (including test) to detect integration errors as quickly as possible. This approach leads to reduced integration problems and a more rapid development of cohesive software.

There are various continuous integration systems that exist today. One such system is Jenkins. Jenkins provides a continuous integration system, making it easier for developers to integrate changes to a project and making it easier for users to obtain a fresh build. However, Jenkins and other systems of today lack the capability of storing build and test results that are easily searchable and accessible to a user. Content repositories are sometimes utilizes as a solution for this problem.

A content repository is a store of content that allows application-independent access to the content, with the ability to store and modify the content in addition to searching and retrieving the content. Content repositories are used in content management systems to store content data and metadata associated with the content data (such as versioning metadata). However, many application files are built and revised over a period of time leading to the continuous integration of new or changed code with the existing code repository, also resulting in multiple integrations. As a result, content repositories face the same difficulty as continuous integration systems of trying to store build and test results of applications in the content repositories that are easily searchable and accessible to a user.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
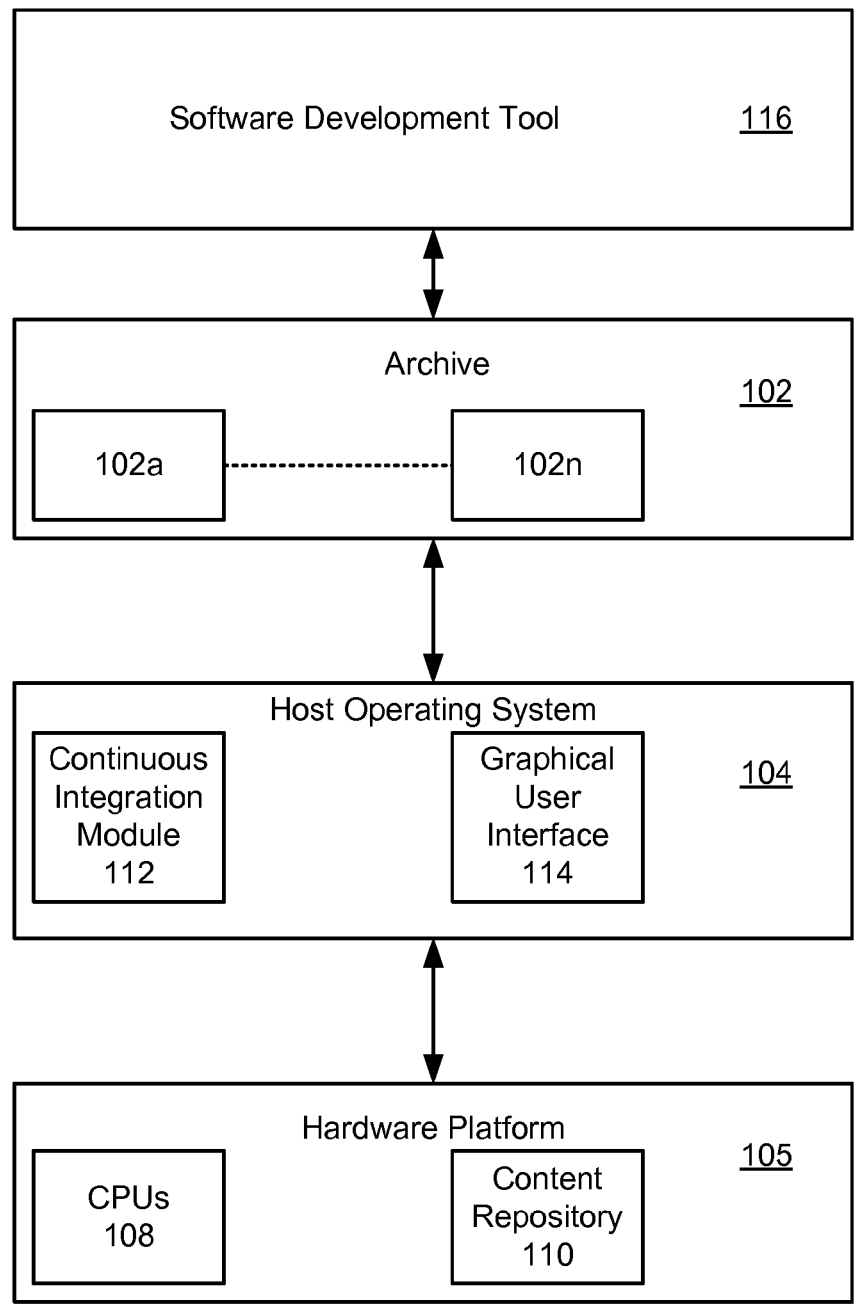
FIG. 1 is a block diagram of a computer system in which the embodiments of the present invention may operate.

Embodiments of the invention provide for mechanism for continuous integration in content repository. A method of embodiments of the invention includes retrieving by a computing system an application from an archive of the computing system, executing at least one test file corresponding to the application and storing the application and results from executing the at least one test file as metadata for the application in the content repository.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "computing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for providing continuous integration in a content repository. A continuous integration module is initialized on a host operation system. The continuous integration module retrieves an application code and a test code associated with the application code from an archive of the computing device and installs it in a content repository. In one embodiment, the test code is stored in a metadata corresponding to the application code in the content repository. The archive is coupled with a software development tool which includes the application and the associated test file corresponding to the application code and the associated test code respectively. The continuous integration module searches for the application and extracts a test file associated with the application and executes the test file. The continuous integration module further stores the results of the test files in the metadata of the corresponding application code. These test results are made available for search.

FIG. 1 is a block diagram illustrating one embodiment of a computer system 100, in which embodiments of the present invention may be implemented. The computer system 100 may be a host machine such as, for example, a server computer, a gateway computer or any other suitable computer system that is configurable for operating as a host. The host machine (HM) (also referred to as a host computer system) 100 comprises an operating system 104, a hardware platform 106 and a software development tool 116. Operating system 104 may include Microsoft Windows', Linux', Solaris', Mac™ OS or any other suitable operating system for managing operations on the computer system 100.

The hardware platform 106 may include one or more central processing units (CPUs) 108, and a content repository 110. The content repository 110 may store content data and metadata. In one embodiment, the content repository 110 is comprised of multiple application codes, test codes associated with the application codes. In another embodiment, content repository 110 is comprised of test results stored as the metadata for the corresponding application codes and the associated test codes. In one embodiment, the content repository 110 is comprised of one or more hardware and software devices, which may be located internally and externally to computer system 100. Examples of content repository 110 include random-access memory (RAM), non-volatile storage memory (e.g., Flash, EEPROM, solid state drives (SSD), etc.), magnetic storage memory (e.g., one or more hard drives), optical memory (e.g., CDs, DVD, Blu-eRay drives, etc.), network interface cards (NICs), sound or video adaptors, photo/video cameras, printer devices, keyboards, displays or any other suitable device intended to be coupled to a computer system.

The operating system 104 is configured with an archive 102 for a computing device. The archive 102 is comprised of application codes 102a-102n and test codes associated with each of the application codes. The archive 102 is coupled to a software development tool 116 that is comprised of multiple applications and test files associated with the multiple applications. In some embodiments, the multiple applications may be separate individual applications or multiple versions of the same application, or a combination of both. The software development tool 116 is configured to create and update the application codes 102a-102n (corresponding to the multiple applications) and their associated test codes (corresponding to the test files) in the archive 102.

The operating system 104 further includes a continuous integration module 112. In one embodiment, the continuous integration module 112 is interfaced by Continuous Integration API, which is a specification for platform application programming interfaces (APIs) to access the archive 102 in a uniform manner. In one embodiment, the continuous integration module 112 retrieves the applications codes 102a-102n and their associated test codes from the archive 102 and installs them in the content repository 110 of the hardware platform 106. In another embodiment, the continuous integration module 112 continuously integrates new or changed application codes with an existing application code in the content repository 110.

In some embodiments, the continuous integration module 112 also searches and extracts test files associated with the applications in the software development tool 116. The continuous integration module 112 executes the test files and stores the results of the test codes in the metadata for the corresponding application code in the content repository 110. The operating system 104 may also include a graphical user interface (GUI) 114 configured to make the test results in the metadata for the corresponding application easily available to a user for search or other actions. Additionally, in some embodiments of the present invention, the applications are JAVA applications and the applications codes are JAVA application codes.

Figure 2:
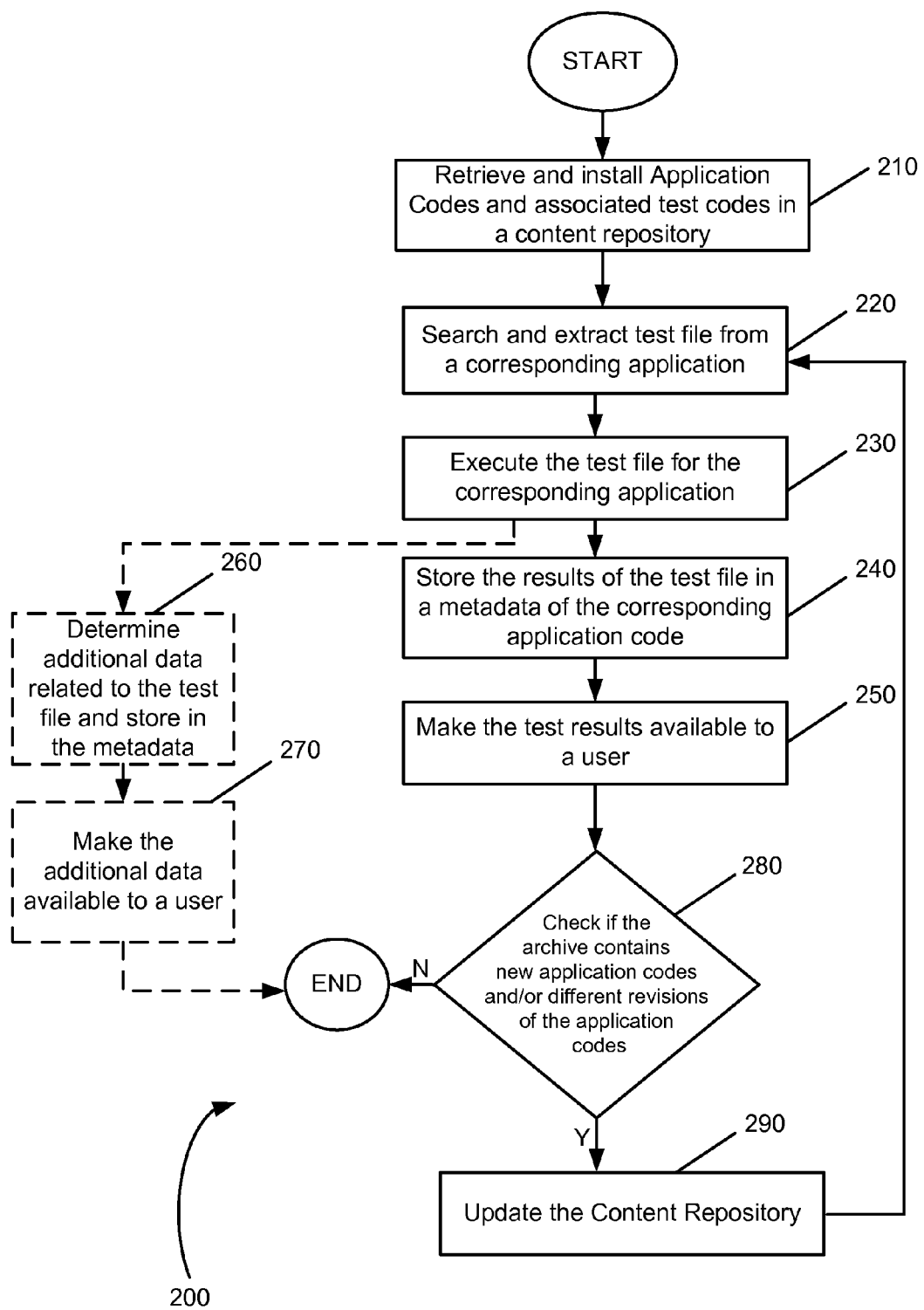
FIG. 2 is a flow diagram of one embodiment of a method for providing continuous integration in a content repository.

FIG. 2 is a flow diagram illustrating a method 200 for providing continuous integration in a content repository according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by the continuous integration module 112 of FIG. 1.

Method 200 begins at block 210 where application codes and the associated test codes in the archive 102 are retrieved and installed into a content repository 110. In one embodiment, the test code is stored as the metadata for the application code. At block 220, a test file associated with the application in the software development tool 116 is searched and extracted. As discussed above, the test file corresponds to the test code in the archive 102 and the application corresponds to the application code in the archive 102. At block 230, the test file is executed for the corresponding application. The results of the test file are stored as metadata for the corresponding application code in the content repository 110 at block 240. At block 250, the test results of the corresponding application code are available to a user. In one embodiment, the test results may be available via a GUI. The test results are made available to a user to perform actions on the test results, such as searching, reporting, analyzing, and so on.

In some embodiments of the present invention, the test results of the test file are passed results. In other embodiments of the present invention, the test results of the test file are failed results. An example of a test file includes business rules functions to test decision function. An example of passed results of this test file include "Test Passed" when the grade is in the B range and an example of failed results of this test file include "Test Failed" when the grade asserted is not in the B range.

Optionally, additional data related to the test file is determined and stored as the meta-data for the application code at block 260. The additional data may include, but is not limited to, archive checksum, test success ratio, test fail ratio, build creator, and current date and time. Alternatively, the additional data may be made available to the user via a GUI at block 270.

Subsequently, at block 290, the archive 102 is checked for one or more new applications codes and/or different versions of the already-existing application codes stored in the content repository 110. If there are no new applications codes and/or different versions of the application codes in the archive 102, the method 200 ends. If the new applications codes and/or different versions of the applications codes exist in the archive, then, at block 290, the content repository is updated with the new applications codes and/or the different versions of the application codes. Method 200 then returns to block 220 to repeat the method.

Figure 3:
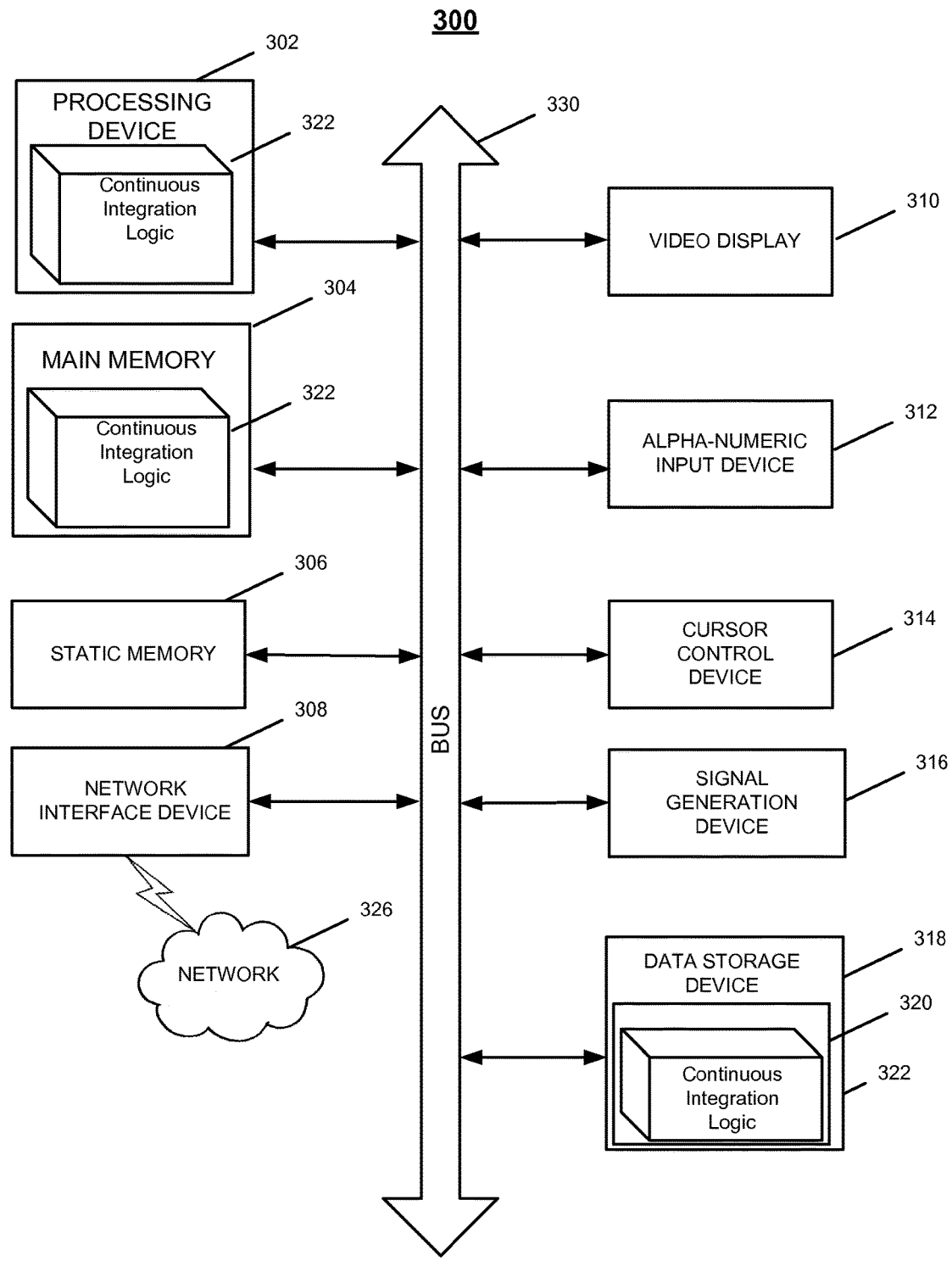
FIG. 3 illustrates a block diagram of one embodiment of a computer system.

FIG. 3 illustrates a diagrammatic representation of a machine in the exemplary form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) (such as synchronous DRAM (SDRAM) or Rambus DRAM (RDRAM), etc.), a static memory 306 (e.g., flash memory, static random access memory (SRAM), etc.), and a data storage device 316, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. The processing device 302 is configured to execute continuous integration logic 322 for performing the operations and steps discussed herein. In one embodiment, continuous integration module 112 described with respect to FIG. 1 performs the continuous integration logic 322.

The computer system 300 may further include a network interface device 308. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 316 (e.g., a speaker).

The data storage device 318 may include a machine-accessible storage medium (or more specifically a computer-readable storage medium) 320 on which is stored one or more sets of instructions (e.g. continuous integration module logic 322) embodying any one or more of the methodologies of functions described herein, such as method 200 for providing continuous integration in a content repository described with respect to FIG. 2 The continuous integration module logic 322 may also reside, completely or at least partially, within the main memory 304 and/or within the processing device 302 during execution thereof by the computer system 300; the main memory 304 and the processing device 302 also constituting machine-accessible storage media.

The machine-readable storage medium 320 may also be used to store the continuous integration module logic 322 persistently containing methods that call the above applications. While the machine-accessible storage medium 320 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
   retrieving, by a continuous integration module, a first application code and a test code corresponding to the first application code from an archive of a computing system, wherein a host operating system of the computing system comprises the continuous integration module and the host operating system provides a graphical user interface, wherein the continuous integration module is interfaced by a continuous integration application programming interface (API) to access the archive, wherein the archive is coupled with a software development tool that comprises a first application corresponding to the first application code and a test file corresponding to the test code;

installing, by the continuous integration module, the first application code and the test code in a content repository of a hardware platform of the computing system, wherein the test code is installed as metadata for the first application code in the content repository;

executing, by the continuous integration module, the test file corresponding to the test code to generate test results for the application code;

storing, by the continuous integration module, the test results in the metadata for the first application code in the content repository;

determining, by the continuous integration module, additional data related to the test file, wherein the additional data is at least one type of data selected from a group consisting of archive checksum, test success ratio, test fail ratio, build creator, and current date and time;

storing, by the continuous integration module, the additional data in the metadata for the first application code in the content repository, wherein the host operating system is to provide, via the graphical user interface, access to search content comprising the test results and the additional data independent of the first application corresponding to the first application code; and integrating, by the continuous integration module, a second application code with the first application code in the content repository, wherein the second application code is a different version of the first application code or a different application code from the first application code, wherein the integrating comprises monitoring, by the continuous integration module, the archive for the second application code and updating the content repository in view of the second application code.

2. The method of claim 1 wherein the archive comprises multiple applications and one or more test files corresponding to the multiple applications.

3. The method of claim 2 wherein the multiple applications comprise one or more versions of the first application.

4. The method of claim 1 further comprising:

responsive to the monitoring, determining, by the continuous integration module, that the second application code exists in the archive;

searching, by the continuous integration module, the software development tool for a second test file associated with a second application that corresponds to the second application code;

extracting, by the continuous integration module, the second test file from the software development tool;

executing, by the continuous integration module, the second test file to generate second test results; and storing, by the continuous integration module, the second test results as second metadata for the second application code in the content repository, wherein the host operating system is to provide, via the graphical user interface, access to one or more of search, report, or analyze the second test results independent of the second application.

5. The method of claim 1, wherein the host operating system is to further provide, via the graphical user interface, the access to report the content independent of the first application.

6. The method of claim 5, wherein the host operating system is to further provide, via the graphical user interface, the access to analyze the content independent of the first application.

7. The method of claim 1, wherein the software development tool creates and updates application codes and test codes in the archive, wherein the application codes correspond to applications in the software development tool and the test codes correspond to test files in the software development tool.

8. A system, comprising:

a memory; and a processing device of a computing system, operatively coupled to the memory, to:

retrieve, by a continuous integration module executed by the processing device, a first application code and a test code corresponding to the first application code from an archive of the computing system, wherein a host operating system of the computing system comprises the continuous integration module and the host operating system provides a graphical user interface, wherein the continuous integration module is interfaced by a continuous integration application programming interface (API) to access the archive, wherein the archive is coupled with a software development tool that comprises a first application corresponding to the first application code and a test file corresponding to the test code;

install, by the continuous integration module, the first application code and the test code in a content repository of a hardware platform of the computing system, wherein the test code is installed as metadata for the first application code in the content repository;

execute, by the continuous integration module, the test file corresponding to the test code to generate test results for the application code;

store, by the continuous integration module, the test results in the metadata for the first application code in the content repository;

determine, by the continuous integration module, additional data related to the test file, wherein the additional data is at least one type of data selected from a group consisting of archive checksum, test success ratio, test fail ratio, build creator, and current date and time;

store, by the continuous integration module, the additional data in the metadata for the first application code in the content repository, wherein the host operating system is to provide, via the graphical user interface, access to search content comprising the test results and the additional data independent of the first application corresponding to the first application code; and integrate, by the continuous integration module, a second application code with the first application code in the content repository, wherein the second application code is a different version of the first application code or a different application code from the first application code, wherein the integrating comprises monitoring, by the continuous integration module, the archive for the second application code and updating the content repository in view of the second application code.

9. The system of claim 8, wherein the archive comprises multiple applications and one or more test files corresponding to the multiple applications.

10. The system of claim 9 wherein the multiple applications comprise one or more versions of the first application.

11. A non-transitory machine-readable storage medium comprising computer programs that, when accessed by a processing device, cause the processing device to:

retrieve, by a continuous integration module executed by the processing device, a first application code and a test code corresponding to the first application code from an archive of a computing system, wherein a host operating system of the computing system comprises the continuous integration module and the host operating system provides a graphical user interface, wherein the continuous integration module is interfaced by a continuous integration application programming interface (API) to access the archive, wherein the archive is coupled with a software development tool that comprises a first application corresponding to the first application code and a test file corresponding to the test code;

install, by the continuous integration module, the first application code and the test code in a content repository of a hardware platform of the computing system, wherein the test code is installed as metadata for the first application code in the content repository;

execute, by the continuous integration module, the test file corresponding to the test code to generate test results for the application code;

store, by the continuous integration module, the test results in the metadata for the first application code in the content repository;

determine, by the continuous integration module, additional data related to the test file, wherein the additional data is at least one type of data selected from a group consisting of archive checksum, test success ratio, test fail ratio, build creator, and current date and time;

store, by the continuous integration module, the additional data in the metadata for the first application in the content repository, wherein the host operating system is to provide, via the graphical user interface, access to search content comprising the test results and the additional data independent of the first application corresponding to the first application code; and integrate, by the continuous integration module, a second application code with the first application code in the content repository, wherein the second application code is a different version of the first application code or a different application code from the first application code, wherein the integrating comprises monitoring, by the continuous integration module, the archive for the second application code and updating the content repository in view of the second application code.

\* \* \* \* \*